(12) United States Patent
Puppa et al.

(10) Patent No.: US 7,596,094 B2
(45) Date of Patent: *Sep. 29, 2009

(54) SYSTEM AND METHOD FOR TRANSMISSION OF OPERATIONS, ADMINISTRATION, AND MAINTENANCE PACKETS BETWEEN ATM AND SWITCHING NETWORKS UPON FAILURES

(75) Inventors: Gary J. Puppa, Orleans (CA); Robin Jeffrey Park, Kanata (CA); Brett Graham Cameron, Ottawa (CA); Gatot Susilo, Kanata (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 617 days.

This patent is subject to a terminal disclaimer.

(21) Appl. No.: 11/417,172

(22) Filed: May 4, 2006

(65) Prior Publication Data

US 2006/0203717 A1 Sep. 14, 2006

Related U.S. Application Data

(63) Continuation of application No. 10/015,575, filed on Dec. 17, 2001, now Pat. No. 7,092,361.

(51) Int. Cl.
*H04J 1/16* (2006.01)
*H04L 12/56* (2006.01)

(52) U.S. Cl. .................... 370/242; 370/236; 370/395.1; 370/401

(58) Field of Classification Search ................. 370/216, 370/241, 252, 389, 395.1, 242, 236, 401
See application file for complete search history.

(56) References Cited

U.S. PATENT DOCUMENTS 6,967,927 B1 * 11/2005 Dugeon et al. ........... 370/236.1
7,061,921 B1 * 6/2006 Sheth .................... 370/395.52

* cited by examiner

*Primary Examiner*—John Pezzlo (57) ABSTRACT

A system and method of notifying a first communication network of a fault related to a second communication network is provided. The first communication network is connected to the second communication network. The first communication network has a first OAM protocol adapted to monitor integrity of the first communication network and the second communication network has a second OAM protocol adapted to monitor integrity of the second communication network. The method includes detecting the fault related to the second communication network and generating a first OAM cell of the first OAM protocol indicating detection of the fault. The method further includes transmitting the first OAM cell to the first communication network to indicate the fault to the first communication network.

22 Claims, 7 Drawing Sheets

SYSTEM AND METHOD FOR TRANSMISSION OF OPERATIONS, ADMINISTRATION, AND MAINTENANCE PACKETS BETWEEN ATM AND SWITCHING NETWORKS UPON FAILURES

This application is a continuation of U.S. patent application Ser. No. 10/015,575, filed Dec. 17, 2001 now U.S. Pat. No. 7,092,361, the disclosure of which is incorporated herein by reference.

FIELD OF THE INVENTION

The invention relates to digital communication systems and more specifically to a network mode capable of providing asynchronous transfer mode traffic to a multi-protocol label switching (MPLS) link.

BACKGROUND OF INVENTION

MPLS is quickly gaining support in the communication industry as a high-speed core of many communication networks. Networks are being developed and deployed which interface ATM networks with MPLS networks. New network systems are being deployed which incorporate both MPLS and ATM network topologies.

For each topology, there is a separate, operations, administration and maintenance (OAM) protocol for generating and transmitting OAM messages whether in cells, packets, frames or another format.

There is a need for a system and method for transmission of information relating to OAM packets between ATM and switching networks, such as MPLS networks, as they are generated and transmitted.

SUMMARY OF INVENTION

In a first aspect, a method of notifying a first communication network of a fault related to a second communication network is provided. The first communication network is connected to the second communication network. The first communication network has a first OAM protocol adapted to monitor integrity of the first communication network and the second communication network has a second OAM protocol adapted to monitor integrity of the second communication network. The method includes detecting the fault related to the second communication network and generating a first OAM cell of the first OAM protocol indicating detection of the fault. The method further includes transmitting the first OAM cell to the first communication network to indicate the fault to the first communication network.

The first communication network may be connected with the second communication network at a network element.

The first communication network may be an ATM network, the first OAM protocol may be an ATM OAM protocol, the second communication network may be a MPLS network and the second OAM protocol may be a MPLS OAM protocol.

Detecting the fault may occur at the network element.

The network element may be adapted to receive connectivity verification cells from the second communication network.

The fault related to the second communication network may be detected at the network element by recognition of expiry of a time interval in which a number of connectivity verification cells have not been received.

The number of connectivity verification cells may be at least three.

The first OAM cell may be an ATM AIS cell.

In a second aspect, a network element for connecting a first communication network to a second communication network is provided. The first communication network has a first communication protocol and a first OAM protocol for use in monitoring integrity of the first communication network. The second communication network has a second communication protocol and a second OAM protocol for use in monitoring integrity of the second communication network. The network element includes a first section adapted to provide communications for the network element with the first communication network and notify the network element of the fault in the first communication network. The first section detects the faults related to the first communication network. The network element also includes a second section adapted to provide communications for the network element with the second communication network, detect that the first section has notified the network element of the fault and notify the second communication network of the fault.

According to one aspect of the invention, there is provided, in an ATM network carrying an ATM connection across a core MPLS network in a label switched path (LSP), an ATM/MPLS edge node for notifying the ATM network of a failure in the LSP, the edge node comprising: an MPLS interface for monitoring operation of the LPS, and generating a failure state indication if the failure affects a routing path across the MPLS network or a MPLS port of the routing path on the edge node; an ATM interface for generating and transmitting an ATM OAM alarm indication signal (AIS) packet on receipt of the failure state indication; and, a controller for monitoring operation of the routing path within the edge node, and operation of the ATM and MPLS interfaces; wherein the MPLS interface transmits the ATM OAM AIS packet transparently over the LSP when the failure affects the MPLS port of the routing path on the edge node, and generates and transmits an MPLS OAM forward defect indication (FDI) packet over the LSP when the failure affects the routing path between the ATM network interface and the MPLS network interface; and, wherein the MPLS network interface comprises: a MPLS OAM state machine for each LSP tunnel originating at the edge node for receiving an MPLS OAM frame indicating a change of state of operation of the routing path carried in a LSP tunnel across the MPLS network; and, an OAM task module for placing change of state signals from all MPLS OAM state machines in a queue and for informing a LSP management system of each change of state in order. In the above edge node, the ATM network interface may further include means for transmitting the ATM OAM AIS to a node in a first segment of the ATM network affected by the failure, if the failure is at the MPLS network interface or in the MPLS network.

According to another aspect of the invention, there is provided, in an ATM network carrying an ATM connection across a core MPLS network in a label switched path (LSP), an ATM/MPLS edge node for notifying the ATM network of a failure in the LSP, the edge node comprising: an MPLS interface for monitoring operation of the LPS, and generating a failure state indication if the failure affects a routing path across the MPLS network or a MPLS port of the routing path on the edge node; an ATM interface for generating and transmitting an ATM OAM alarm indication signal (AIS) packet on receipt of the failure state indication; and, a controller for monitoring operation of the routing path within the edge node, and operation of the ATM and MPLS interfaces; wherein the MPLS interface transmits the ATM OAM AIS packet transparently over the LSP when the failure affects the MPLS port of the routing path on the edge node, and generates and transmits an MPLS OAM forward defect indication (FDI) packet over the LSP when the failure affects the routing path between the ATM network interface and the MPLS network interface; and, wherein the ATM network interface further comprises means for transmitting the ATM OAM AIS to a node in a first segment of the ATM network affected by the failure, if the failure is at the MPLS network interface or in the MPLS network. In the above edge node, the MPLS network interface may include: a MPLS OAM state machine for each LSP tunnel originating at the edge node for receiving an MPLS OAM frame indicating a change of state of operation of the routing path carried in a LSP tunnel across the MPLS network; and, an OAM task module for placing change of state signals from all MPLS OAM state machines in a queue and for informing a LSP management system of each change of state in order.

According to another aspect of the invention, there is provided, for an ATM network carrying an ATM connection in a label switched path (LSP) over a core MPLS network, a method of notifying network nodes about a disruption in service, comprising the steps of: a) providing an ATM/MPLS edge switch at an interface between the ATM network and the MPLS network; b) establishing a routing path traversing a first segment of the ATM network, over the edge switch to the MPLS network towards a second segment of the ATM network; c) monitoring the routing path at the edge switch and generating an alarm signal upon detection of a fault affecting the LSP; and, d) transmitting the alarm signal to all network nodes of the ATM network affected by the fault. In the above method, step c) may include: c1) generating a change of state signal at a MPLS network interface on the edge switch for providing a failure state indication for the LSP; c2) transmitting the failure state indication to an ATM network interface on the edge switch; and, c3) based on the indication, generating at the ATM network interface the alarm signal, wherein the alarm signal is an ATM OAM alarm indication signal (AIS) packet. Step c1) may include: monitoring from the MPLS network interface a status of the LSP using MPLS OAM packets received from the MPLS network; and, detecting the fault and generating the failure state indication at the MPLS network interface, wherein the failure state indication indicates a failure in the LSP across the MPLS network. Step c1) may include: monitoring from the MPLS network interface operation of a MPLS port of the LSP using physical interface circuitry; and, detecting the fault and generating the failure state indication at the MPLS network interface, wherein the failure state indication indicates a failure at the MPLS port of the edge switch. Step c) may include: monitoring from the edge switch, operation of the MPLS network interface using a controller provided on the edge switch; detecting the fault at the MPLS network interface and generating the failure state indication demonstrating a failure at the MPLS network interface and transmitting the failure state indication to an ATM network interface on the edge switch; and, at the ATM network interface, generating the alarm signal; wherein the alarm signal is an ATM OAM alarm indication signal (AIS) packet, based on the failure state indication. Step c) may include: monitoring the routing path between an MPLS network interface and an ATM network interface at the edge switch using a controller provided on the edge switch; detecting the fault within the edge switch and generating a failure state indication demonstrating a failure on the routing path between the ATM network interface and the MPLS network interface; based on the failure state indication, generating at the ATM network interface an ATM OAM alarm indication signal (AIS) packet; and, generating at the MPLS network interface an MPLS OAM forward defect indication (FDI) packet. Step c) may include: monitoring operation of an ATM interface at the edge switch from a controller on the edge switch; detecting the fault at the ATM network interface and generating a failure state indication demonstrating a failure on the routing path at the ATM network interface; and, generating at the MPLS network interface an ATM OAM alarm indication signal (AIS) packet based on the failure state indication. And, step c) may include: monitoring from an ATM network interface operation of the routing path at an ingress port on the edge switch; detecting the fault at the ingress port and generating a failure state indication demonstrating a failure on the ingress port; transmitting the failure state indication to an MPLS network interface on the edge switch; and, generating at the MPLS network interface an ATM OAM alarm indication signal (AIS) packet based on the indication.

According to another aspect of the invention, there is provided a method of notifying a first communication network of a fault related to a second communication network, the first communication network connected to the second communication network, the first communication network having a first OAM protocol adapted to monitor integrity of the first communication network, the second communication network having a second OAM protocol adapted to monitor integrity of the second communication network, the method comprising: detecting the fault related to the second communication network; generating a first OAM cell of the first OAM protocol indicating detection of the fault; and, transmitting the first OAM cell to the first communication network to indicate the fault to the first communication network; wherein the first communication network is connected with the second communication network at a network element; and, wherein the first communication network is an ATM network, the first OAM protocol is an ATM OAM protocol, the second communication network is a MPLS network, and the second OAM protocol is a MPLS OAM protocol. In the above method, the first OAM cell may be an ATM AIS cell.

According to another aspect of the invention, there is provided a network element for connecting a first ATM communication network to a second MPLS communication network, the first ATM communication network having a first communication protocol and a first ATM OAM protocol for use in monitoring integrity of the first ATM communication network, the second MPLS communication network having a second communication protocol and a second MPLS OAM protocol for use in monitoring integrity of the second MPLS communication network, the network element comprising: a first ATM section for providing communications for the network element with the first ATM communication network, for notifying the network element of a fault in the first ATM communication network, and for detecting the fault by receiving an OAM forward defect indicator (FDI) cell of the first ATM OAM protocol; and, a second MPLS section for providing communications for the network element with the second MPLS communication network, for detecting that the first ATM section has notified the network element of the fault, and for notifying the second MPLS communication network of the fault. In the above network element, the network element may be an edge switch, the first ATM section may include an ATM card, and the second MPLS section may include a MPLS card. The fault may be detected by the first ATM section after receiving an OAM cell of the first OAM protocol. The OAM cell may be a FDI cell. The first ATM section may periodically transmits connectivity verification cells to the first ATM communication network. The fault in the first ATM communication network may be detected by the first ATM section by recognition of expiry of a time interval without receiving at least one of the connectivity verification cells, the first ATM section being scheduled to receive a number of the connectivity verification cells in the interval. The number of the connectivity verification cells may be at least three. And, the first OAM FDI cell may be an ATM AIS cell.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

1.0 Basic Features of System

Briefly, the embodiment provides a system and method for transmission of information in OAM messages from a non-ATM network.

In the embodiment, an ATM/MPLS edge switch, provides a connection point for an ATM network to a MPLS network, monitors the integrity of a routing path in the MPLS network connected to the edge switch and transmits fault information received in MPLS OAM frames associated with the MPLS routing path to the connected ATM networks.

First a description of a network configuration which a network element associated with the embodiment is provided, followed by a description of components of the elements. Next, error OAM protocols received and processed by the network element for two different network. protocols are described, and finally an interface system for the different OAM schemes for the two different networks is described.

2.0 System Configuration

Figure 1:
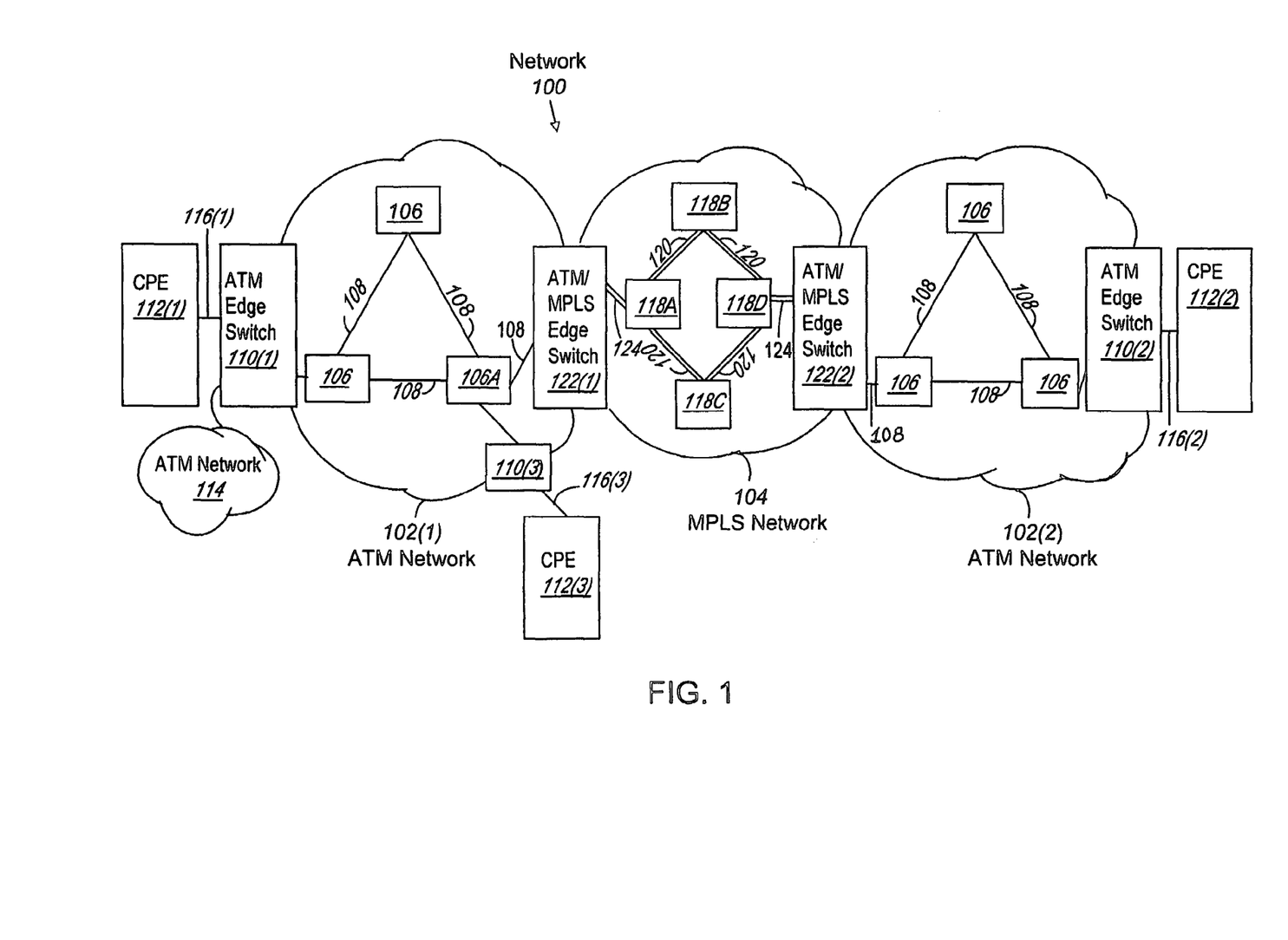
FIG. 1 is a block diagram of a communication network comprising two edge switches according to an embodiment of the invention which each link an ATM network to a Multi-Protocol Label Switching (MPLS) network.

Following is a description of a network having a switch associated with the embodiment. Referring to FIG. 1, communications network 100 is shown, comprising a first ATM network 102(1), a second ATM network 102(2) and a multi-protocol label switched (MPLS) network 104. ATM networks 102 comprise a number of interconnected ATM switches 106 connected by communications links 108 which can each carry ATM traffic thereon.

At the edge of ATM network 102(1), ATM edge switch 110(1) provides a connection for Customer Premise Equipment (CPE) 112(1) to ATM network 102(1) via link 116(1). Similarly, at an edge of ATM network 102(2), ATM edge switch 110(2) provides a link for CPE 112(2) to ATM network 102(2) via link 116(2). ATM edge switch 110(1) is shown having a connection to another ATM network 114. ATM edge switch 110(1) is connected to elements in ATM network 102(1). Similarly, ATM edge switch 110(2) is connected to elements in ATM network 102(2).

MPLS network 104 comprises MPLS switches 118 which are connected together via communications links 120. At one edge of MPLS network 104, ATM/MPLS edge switch 122(1) provides an interface between ATM network 102(1) and MPLS network 104. At another edge of MPLS network 104, ATM/MPLS edge switch 122(2) provides an interface between ATM network 102(2) and MPLS network 104.

Figure 2:
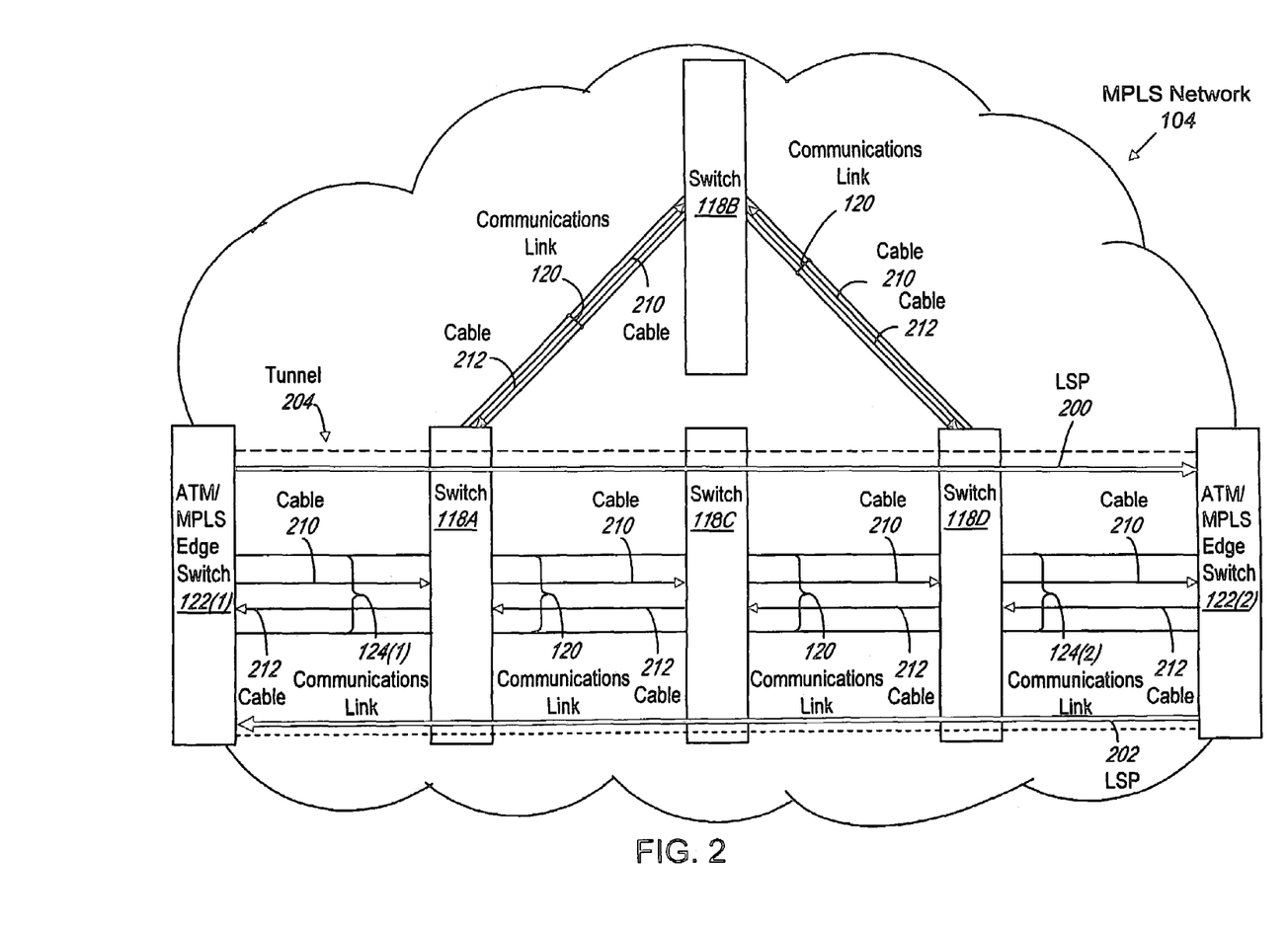
FIG. 2 is a block diagram of the tunnel in the MPLS network connecting the ATM/MPLS edge switches of FIG. 1.

Referring to FIG. 2, ATM/MPLS edge switches 122 communicate with MPLS switches 118 in MPLS network 104 via communications links 124. Communications links 124 are two fibre optic cables carrying uni-directional data between an MPLS switch 118 and an ATM/MPLS edge switch 122. Communications links 120 are two fibre optic cables carrying uni-directional data between two MPLS switches 118. In communications link 124(1), communications carried from ATM/MPLS edge switch 122(1) to MPLS switch 118A, in the direction of ATM/MPLS edge switch 122(2), are carried on a cable 210; communications in the other direction are carried on a cable 212. Similarly communications links 120 and 124(2) have cables 210 in the direction of ATM/MPLS edge switch 122(2) and cables 212 in the direction of ATM/MPLS edge switch 122(1).

MPLS switches 118 utilize dedicated and pre-arranged MPLS routing paths to carry traffic within MPLS network 104. These dedicated and pre-arranged MPLS routing paths or tunnels are composed of two uni-directional label switched paths (LSPs) 200 and 202 between ATM/MPLS edge switches 122(1) and 122(2). It will be appreciated that the term "tunnel" is interchangeable with the term "MPLS routing path". In tunnel 204, LSP 200 carries traffic from ATM/MPLS edge switch 122(1) to ATM/MPLS edge switch 122(2). Similarly, in tunnel 204, LSP 202 carries traffic from ATM/MPLS edge switch 122(2) to ATM/MPLS edge switch 122(1).

2.1 ATM and MPLS Format Conversion

Figure 3:
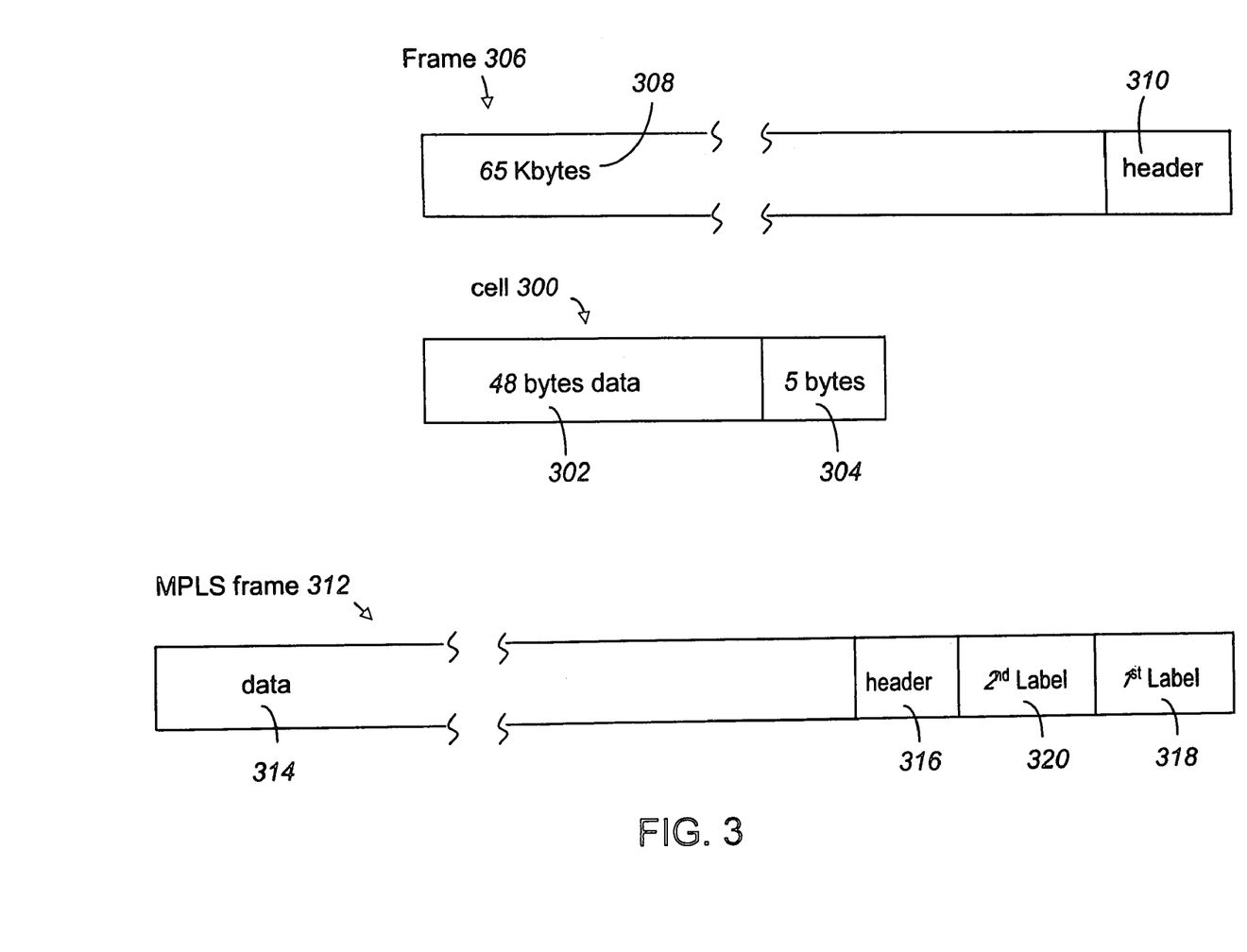
FIG. 3 is a block diagram of an ATM cell and an ATM frame and their equivalent MPLS frame generated and manipulated by one edge switch of FIG. 1.

As ATM/MPLS edge switches 122 are at the edge of an ATM network and a MPLS network, each ATM/MPLS edge switch 122(1) must translate ATM cells and frames to MPLS frames and vice versa for traffic sent between ATM network 102 and MPLS network 104. Referring to FIG. 3, aspects of the conversion of ATM cells and frames received from CPE 110(1) by ATM/MPLS edge switch 122(1) to MPLS frames, and vice versa are shown.

As is known in the art ATM data may be either encapsulated into cells or frames. Cell 300 comprises 48 bytes of data in data field 302 and five bytes of header data in header field 304. The header field 304 includes data relating to error checks and destination information. Frequently, ATM cells 300 are used to encode voice calls in AAL 1/2/5 signalling parameters. ATM frames are used to carry larger sizes of data. Exemplary ATM frame 306 comprises data field 308 which may have 65 Kbytes of data. Header field 310 is comparable to header field 304 used in ATM cell 300. When ATM traffic leaves ATM network 102 and is provided to MPLS 104, for each of the ATM cells 300 and the ATM frames 306, the data and header information must be transposed into a MPLS frame 312.

MPLS frame 312 comprises data field 314, header field 316, first label field 318 and second label field 320. When transposing data of an ATM cell 300 or frame 306 to a MPLS frame 312, the respective ATM data field (either data field 302 or 308) is inserted into MPLS data field 314. Similarly, the contents of the respective ATM cell or frame header fields (either header field 304 or header field 310) is inserted into MPLS header field 316. Header field 316 may be a component of data field 314. The contents of first label 318 and second label 320 provide routing information for MPLS frame 312 through MPLS network 104. First label field 318 contains identification information relating to the MPLS routing path for the MPLS frame 306. Second label field 320 contains connection information relating to the particular internal ATM connection which is to be used by the ATM/MPLS edge switch 122 at the end of the routing path for a connection to the downstream ATM network 102.

2.2 Switch Description

Figure 4:
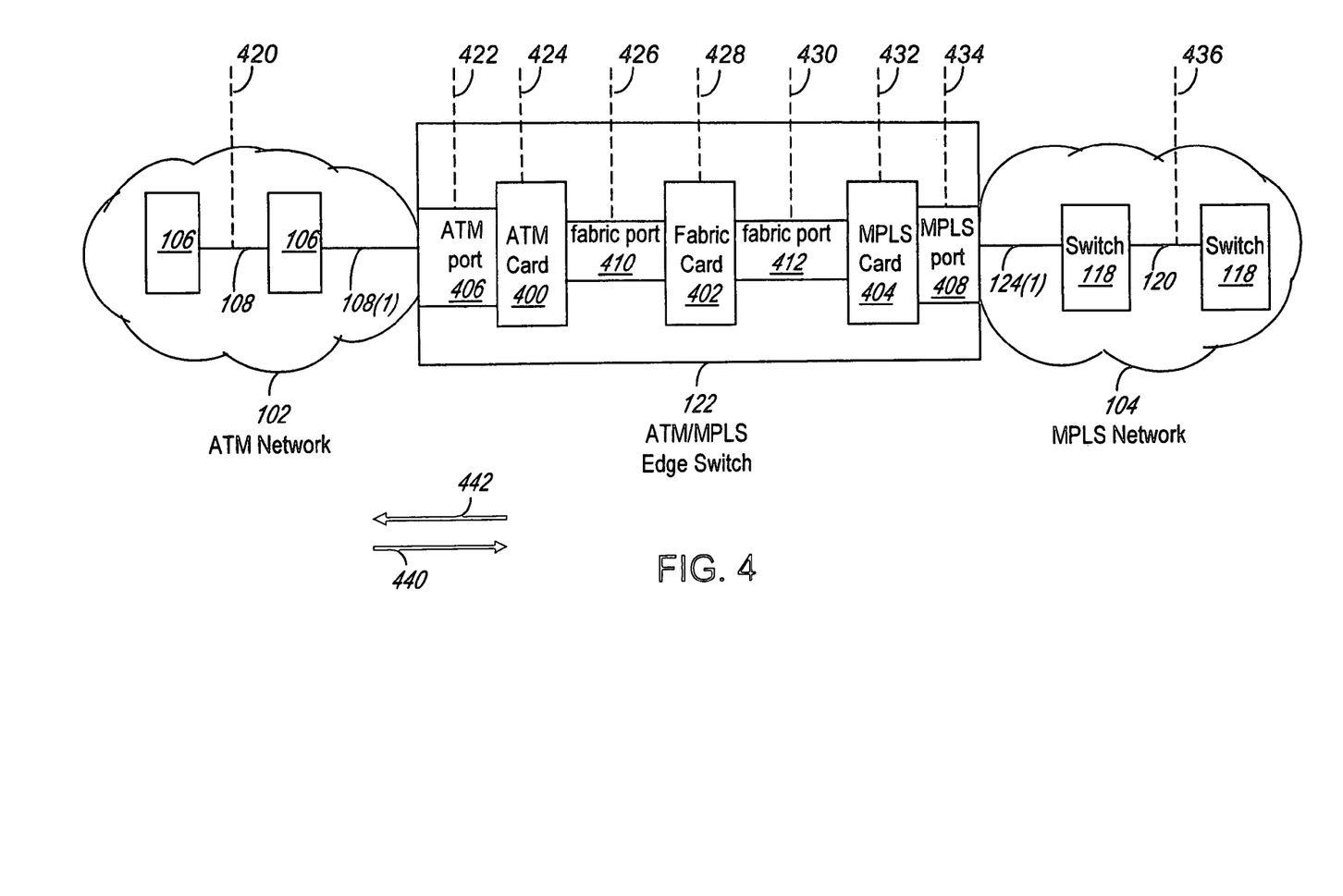
FIG. 4 is a block diagram illustrating points of failure in the ATM network, the ATM/MPLS edge switch and the MPLS network of FIG. 1.

Referring to FIG. 4, ATM/MPLS edge switch 122 comprises an ATM card 400, a fabric card 402, an MLPS card 404, at least one ATM port 406, at least one MPLS port 408, two fabric ports 410 and 412, a control card (not shown in this figure) and two I/O cards (not shown).

ATM/MPLS edge switch 122 interfaces ATM network 102 with MPLS network 104. Therefore, it has an ATM (line) card 400 for interfacing with a connection to ATM network 102 and a MPLS (line) card 404 for interfacing with a connection to MPLS network 104. ATM network 102 connects to ATM card 400 of ATM/MPLS edge switch 122 via link 108(1) through ATM port 406 and an input/output (I/O) card (not shown). MPLS network 104 connects to MPLS card 404 via link 124(1) through MPLS port 408 and an I/O card (not shown). Inside ATM/MPLS edge switch 122, ATM card 400 can provide traffic to fabric card 402 through fabric port 410 and fabric card 402 can connect to MPLS card 404 through fabric port 412.

In direction 440, ATM card 400 receives cells 300 and frames 306 transmitted from ATM network 102 and converts them into an internal format for processing by fabric card 402. For traffic destined for MPLS network 104, fabric card 402 forwards the traffic to the appropriate MPLS card 404. MPLS card 404 converts its received traffic into MPLS frames 312 as described earlier and transmits the MPLS frames 312 to MPLS network via link 124(1).

In direction 442, MPLS card 404 receives MPLS frames 312 transmitted from MPLS network 104 over link 124(1) and converts them into an internal format for processing by fabric card 402. MPLS card 404 forwards the internal data to fabric card 402. For traffic destined for ATM network 102, fabric card 402 forwards its output to the appropriate ATM card 400. ATM card 400 converts the traffic into cells 300 or frames 306 as shown in FIG. 3 and transmits them into ATM network 102 over link 108(1).

In addition to providing a traffic interface for ATM/MPLS traffic ATM/MPLS edge switch 122 is capable of indicating a failure in MPLS network 104 to ATM network 102 by monitoring tunnel 204 and by messaging to ATM network 102 the arrival of MPLS OAM frames.

3.0 ATM and MPLS OAM

Referring again to FIG. 1, in an ATM network 102(1), when communications are sent from CPE 112(1), through an ATM network 102(1) to CPE 112(3), a routing path is established from CPE 112(1), through ATM edge switch 110(1), switches 106 in ATM network 102(1), ATM edge switch 110(3) and is received at CPE 112(3). Upon a failure of an element in this routing path, for example communications link 108, an ATM OAM cell is generated and transmitted over ATM network 102(1) to inform ATM edge switches 110(1) and 110(3) of the failure. In particular, an ATM OAM Alarm Indication Signal (AIS) cell is generated and transmitted in the downstream direction towards CPE 112(3). An ATM AIS cell is transmitted from ATM switch 106A in lieu of the data cells to maintain transmission continuity and to indicate to ATM edge switch 110(3) that there is a transmission interruption located either at the equipment originating the ATM AIS cell or upstream of that equipment. When ATM edge switch 110(3) receives the ATM AIS cell, it generates and transmits an ATM OAM Remote Defect Indicator (RDI) cell over the same routing path towards CPE 112(1) which arrives at ATM edge switch 110(1). This informs both ATM edge switches 110(1) and 110(3) about the failure in the routing path. ATM edge switches 110(1) and 110(3) can then inform CPEs 112(1) and 112(3) of the failure.

Referring to FIG. 2, in MPLS network 104 LSPs 200 and 202 may each carry specialized operation, administration and maintenance (OAM) MPLS frames. The MPLS OAM frames follow ITU Y.17 MPLS standards, which are incorporated herein by reference. There are three types of MPLS OAM frames used by the embodiment:

1) Connectivity verification (CV) frames;

2) Backward defect indicator (BDI) frames; and

3) Forward defect indicator (FDI) frames.

The type of MPLS OAM frame transmitted within an LSP 200 or 202 is identified via the header information and the second label field 320 in a MPLS frame 312. The first label field 318 contains the tunnel identification information related to the OAM destination. Presently, in the embodiment, a MPLS OAM frame is identified with a value defined by the MPLS standards bodies. Currently, the value is "5". This value is placed in second label field 320. The contents of the data field 314 identify the type of MPLS OAM frame.

In the embodiment for a given MPLS tunnel 204, MPLS OAM frames are sent therein to monitor the status of the tunnel 204.

To monitor and test the integrity of tunnel 204, dedicated CV frames are transmitted from ATM/MPLS edge switch 122 at one end of tunnel 204 to the switch at the other end. At the downstream switch MPLS OAM frame(s) are received and analysed. Depending on the results of the analysis, the downstream switch may generate a type of response MPLS OAM frame which is transmitted upstream to the originating switch along its the associated LSP. At the originating switch, MPLS OAM frame(s) are received and analysed. The MPLS OAM frame(s) received at the originating switch 122 will indicate the status of the entire tunnel 204. For the purposes of the example, upstream switch is ATM/MPLS edge switch 122(1)

and downstream switch is ATM/MPLS edge switch 122(2) for tunnel 204.

There are four cases of conditions in the LSPs 200, 202 or the receiving ATM/MPLS edge switch 122(2) and other downstream components beyond ATM/MPLS edge switch 122(2). In Case A, tunnel 204 has no transmission problems therein. ATM/MPLS edge switch 122(1) generates and transmits CV frames on LSP 200. The CV frames are received by ATM/MPLS edge switch 122(2) which generates other CV frames which are transmitted over LSP 202. These other CV frames are received at ATM/MPLS edge switch 122(1) and ATM/MPLS edge switch 122(1) can determine that tunnel 204 is fully operational by the receipt of the CV frames with no other MPLS OAM frames.

CV frames are generated by ATM/MPLS edge switches 122 every one second according to ITU Y.17 standards. Accordingly, after a certain transmission and frame processing delay, when tunnel 204 and its downstream components which affect tunnel 204 are fully operational, the CV frames received by ATM/MPLS edge switch 122 should arrive approximately once every second. It will be appreciated that other time intervals could be used for transmitting CV frames.

In Case B, it is presumed that there is a failure in LSP 200. Accordingly, when ATM/MPLS edge switch 122(1) generates and transmits a CV frame onto LSP 200, ATM/MPLS edge switch 122(2) does not receive it. ATM/MPLS edge switch 122(2) generates a response MPLS BDI frame which indicates that a failure has occurred backwards in LSP 200. The MPLS BDI frame is transmitted on LSP 202 and is received at ATM/MPLS edge switch 122(1). ATM/MPLS edge switch 122(1) then can determine that tunnel 204 is not fully operational.

In Case C, it is presumed that there is a failure in both LSP 200 and LSP 202. As with Case B, CV frame from ATM/MPLS edge switch 122(1) is not received by ATM/MPLS edge switch 122(2). In response ATM/MPLS edge switch 122(2) generates and transmits a MPLS BDI frame to ATM/MPLS edge switch 122(1). Further, ATM/MPLS edge switch 122(1) does not receive the MPLS BDI frame. Accordingly, ATM/MPLS edge switch 122(1) recognizes the absence of any response to the originally transmitted CV frame and determines that tunnel 204 is not fully operational.

Case D is a variation of Case A. In a normal situation if tunnel 204 is fully operational, ATM/MPLS edge switch 122(1) and ATM/MPLS edge switch 122(2) will be able to transmit and receive CV frames therebetween. However, if ATM/MPLS edge switch 122(2) has an indication that downstream to it, there is a further failure which affects tunnel 204, ATM/MPLS edge switch 122(1) generates a MPLS FDI frame, which indicates that forward of ATM/MPLS edge switch 122(2) there is a further integrity problem associated with tunnel 204. The MPLS FDI frame is transmitted from ATM/MPLS edge switch 122(2) to ATM/MPLS edge switch 122(1) via LSP 202. The MPLS FDI frame is received by ATM/MPLS edge switch 122(1). ATM/MPLS edge switch 122(1) can then recognize the fault downstream of tunnel 204. This case may also be an extension of Case B if a fault in tunnel 204 causes ATM/MPLS edge switch 122(2) to not receive CV frames from ATM/MPLS edge switch 122(1). In this case, both a MPLS FDI frame and a BDI frame are transmitted from ATM/MPLS edge switch 122(2) to ATM/MPLS edge switch 122(1) via LSP 202.

The Cases are summarized in the following Table A:

| Case | Frames received at ATM/IP edge switch 122 | LSP 200 Status | LSP 202 States |
|---|---|---|---|
| A | CV | Up | Up |
| B | CV, BDI | Down | Up |
| C | None | Unknown | Down |
| D1 | FDI | Up | Down |
| D2 | BDI, FDI | Down | Down |

It will be appreciated that MPLS switches 118 may be configured to generate and transmit MPLS OAM frames such that the use of CV frames is not necessary to detect failures in tunnel 204. If MPLS switches 118 can detect a failure in LSP 200, an MPLS switch 118 may generate and transmit a MPLS FDI frame downstream along LSP 200, toward ATM/MPLS edge switch 122(2). Upon receiving the MPLS FDI frame, ATM/MPLS edge switch 122(2) generates and transmits a MPLS BDI frame over LSP 202 to ATM/MPLS edge switch 122(1).

3.1 Failures Resulting in Generation and Transmission of OAM Cells or Frames

Referring again to FIG. 4, propagation of error information in a tunnel in MPLS network 104 to ATM network 102 by switch 122 is shown.

If tunnel 204 fails per Cases C, Case D1 and Case D2 indicating a fault in tunnel 204 in direction 442 (for example, due to a failure at point 436 in a cable leading towards ATM/MPLS edge switch 122), MPLS card 404 receives and interprets the corresponding error state. ATM/MPLS edge switch 122 processes the error state information and further generates ATM AIS cell which is transmitted from ATM card 400 (point 424) towards ATM network 102 in direction 442 on connections that were associated with tunnel 204.

If ATM/MPLS edge switch 122 receives MPLS BDI frames per Cases C and Case D2 indicating a fault in tunnel 204 in direction 440 (for example, due to a failure at point 436 in a cable leading away from ATM/MPLS edge switch 122), no ATM AIS cells are generated and transmitted to ATM network 102. Instead, ATM RDI cells will pass through LSP 202 to ATM network 102, as described below.

If there is a fault in MPLS port 408 or its I/O card (i.e. a failure at point 434), ATM/MPLS edge switch 122 recognizes the fault and generates an ATM AIS cell which is transmitted from ATM card 400 (point 424) towards ATM network 102 in direction 442 on ATM connections linked to MPLS card 404 and MPLS port 408.

If MPLS card 404 fails and there is no redundant MPLS card 404 (i.e. a failure at point 432), ATM/MPLS edge switch 122 recognizes the fault and generates an ATM AIS cell which is transmitted from ATM card 400 (point 424) towards ATM network 102 in direction 442 on ATM those connections linked to MPLS card 404.

If fabric port 412 fails (i.e. a failure at point 430), ATM/MPLS edge switch 122 recognizes the fault and generates an ATM AIS cell which is transmitted from ATM card 400 (at point 424) towards ATM network 102 in direction 442 on ATM connections linked to fabric port 412. Also, a MPLS FDI frame is generated and transmitted from the MPLS card 404 having a connection to the fabric port 412 in direction 440 to all connected tunnels 204.

If fabric card 402 fails or is removed and there is no redundant fabric card 402 (i.e. a failure at point 428), ATM/MPLS edge switch 122 recognizes the fault and generates an ATM AIS cell which is transmitted from ATM card 400 towards ATM network 102 in direction 442 on all connections associated with fabric card 402. Also, a MPLS FDI frame is generated and transmitted from MPLS card 404 (point 432) in direction 440 on all tunnels 204 that have tunnel monitoring enabled.

If fabric port 410 fails (i.e. a failure at point 426), ATM/MPLS edge switch 122 recognizes the fault and generates an ATM AIS cell which is transmitted from ATM card 400 towards ATM network 102 in direction 442 on ATM connections associated with fabric port 410. An ATM AIS cell is generated and transmitted from the MPLS card 404 (point 432) towards the MPLS network 104 in direction 440 on those connections from the ATM card 400 with the failed fabric port 410. ATM OAM cells are supported in MPLS network 104 using cell mode encapsulation by transparently passing ATM OAM cells through MPLS network 104. MPLS card 404 simply passes ATM OAM cells from ATM network 102 with data cells through MPLS tunnel 204 if the connection is configured to use cell mode encapsulation. No ATM AIS cells are transmitted for connections configured using frame mode encapsulation. These ATM AIS cells are then carried transparently across their corresponding MPLS tunnel 204 to the far-end ATM network 102.

If ATM card 400 of ATM/MPLS edge switch 122 fails and there is no redundant ATM card 400 (i.e. a failure at point 424), ATM/MPLS edge switch 122 recognizes the fault and generates an ATM AIS cell which is transmitted from MPLS card 404 (point 432) towards MPLS network 104 in direction 440. This is done for all connections in direction 440 using cell mode encapsulation connected to the faulted ATM card 400. These ATM AIS cells are then carried transparently across their corresponding MPLS tunnel 204 to the far-end ATM network 102.

If there is a fault in ATM port 406 or its I/O card (a failure at point 422), then ATM/MPLS edge switch 122 recognizes the fault and generates an ATM AIS cell from ATM card 400. ATM/MPLS edge switch 122 transmits the ATM AIS cell in direction 440, into ATM/MPLS edge switch 122 for connections associated with the failed ATM port 406 configured to use cell mode encapsulation. ATM/MPLS edge switch 122 passes these ATM OAM cells through MPLS tunnel 204. If the connection is configured to use frame mode encapsulation, then no ATM AIS cells are generated and transmitted.

In the event of a failure in ATM network 102 (for example, a failure in communications link 108 at point 420), then an ATM AIS OAM cell is generated by a switch in ATM network 102 and transmitted in direction 440, towards ATM/MPLS edge switch 122, on all ATM connections. ATM/MPLS edge switch 122 passes this ATM OAM cell transparently through MPLS tunnel 204 as a typical cell if the connection uses cell mode encapsulation. If the connection is configured to use frame mode encapsulation, then the ATM OAM cell is terminated at ATM card 400 of ATM/MPLS edge switch 122.

4.0 MPLS and ATM OAM Interworking

Figure 5:
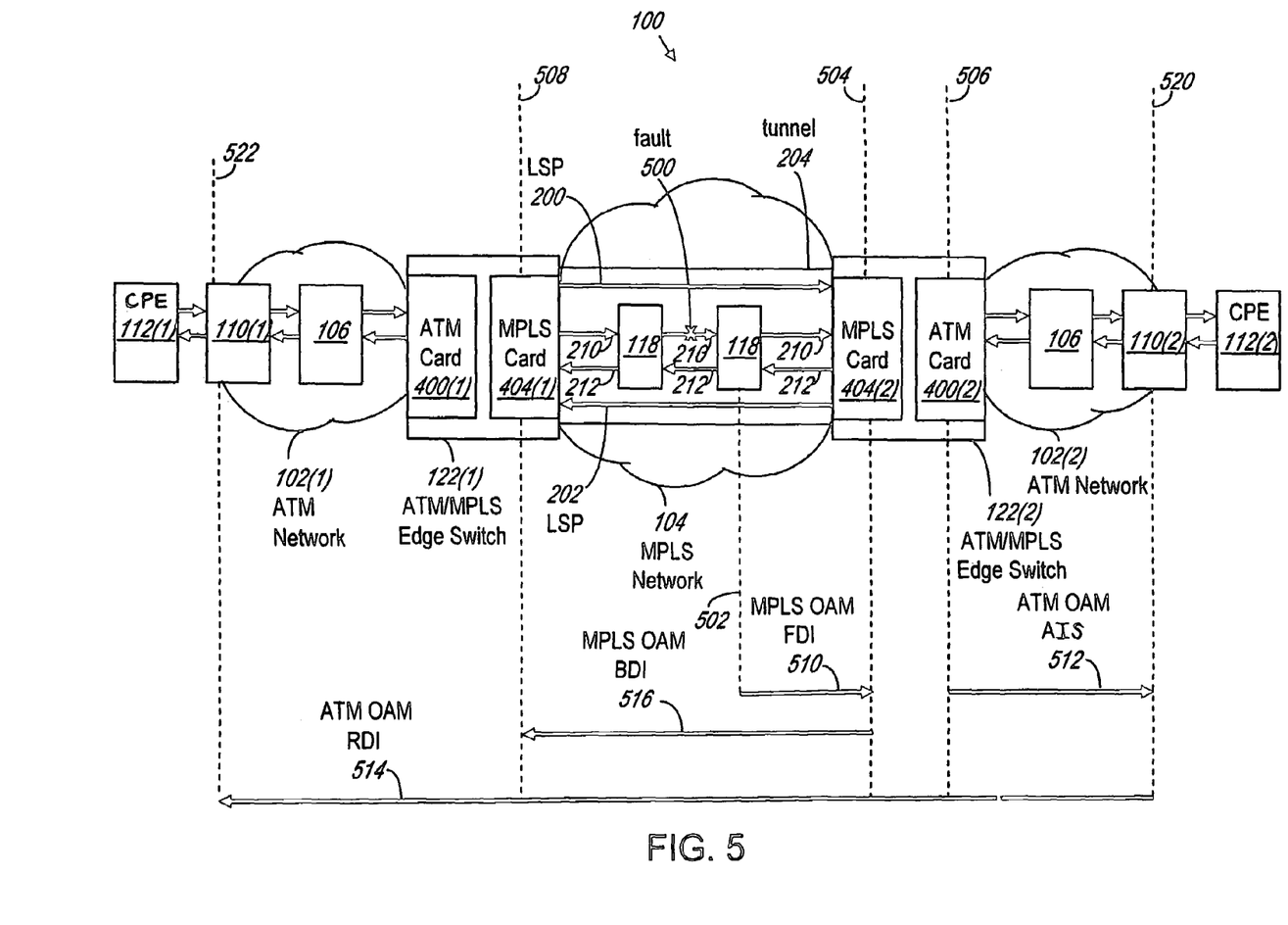
FIG. 5 is a block diagram illustrating the relationship between ATM OAM cells and MPLS OAM frames in the network of FIG. 1.

Referring to FIG. 5, the correlation of ATM OAM cells and MPLS OAM frames is illustrated in more detail. In network 100, CPE 112(1) transmits cells or frames to CPE 112(2), as described previously. If a fault 500 occurs in MPLS network 104, ATM/MPLS edge switch 122(2) detects the fault by either receiving MPLS FDI frames from MPLS switch 118 at point 502 or by failing to receive CV frames. The transmission of MPLS FDI frames, if any, is indicated by arrow 510 extending between point 502 and point 504.

ATM/MPLS edge switch 122(2) transmits MPLS BDI frames from MPLS card 404(2) (point 504) towards ATM/MPLS edge switch 122(1). ATM/MPLS edge switch 122(2) also transmits ATM AIS cells from ATM card 400(2) (point 506) towards CPE 112(2). The transmission of ATM AIS cells is indicated by arrow 512 extending between point 506 and point 520.

When the ATM AIS cells arrive at ATM edge switch 110(2), ATM edge switch 110(2) notifies CPE 112(2) and transmits ATM RDI cells towards CPE 112(1). These ATM RDI cells transmitted towards CPE 112(1) are transparently passed through MPLS network 104 over tunnel 204. The ATM RDI cells arrive at ATM edge switch 110(1) which informs CPE 112(1) of the fault. The transmission of ATM RDI cells is indicated by arrow 514 extending between point 520 and point 522.

When the MPLS BDI frames arrive at ATM/MPLS edge switch 122(1), MPLS card 404(1) removes the MPLS BDI frames from the datastream at point 508. MPLS BDI frames do not continue to ATM edge switch 110(2) since ATM RDI cells are transmitted to ATM edge switch 110(2). The transmission of MPLS BDI frames is indicated by arrow 516 extending between point 504 and point 508. Therefore, MPLS OAM frames are transmitted only on MPLS network 104.

4.1 Tunnel Status and ATM Connection Control

Figure 6:
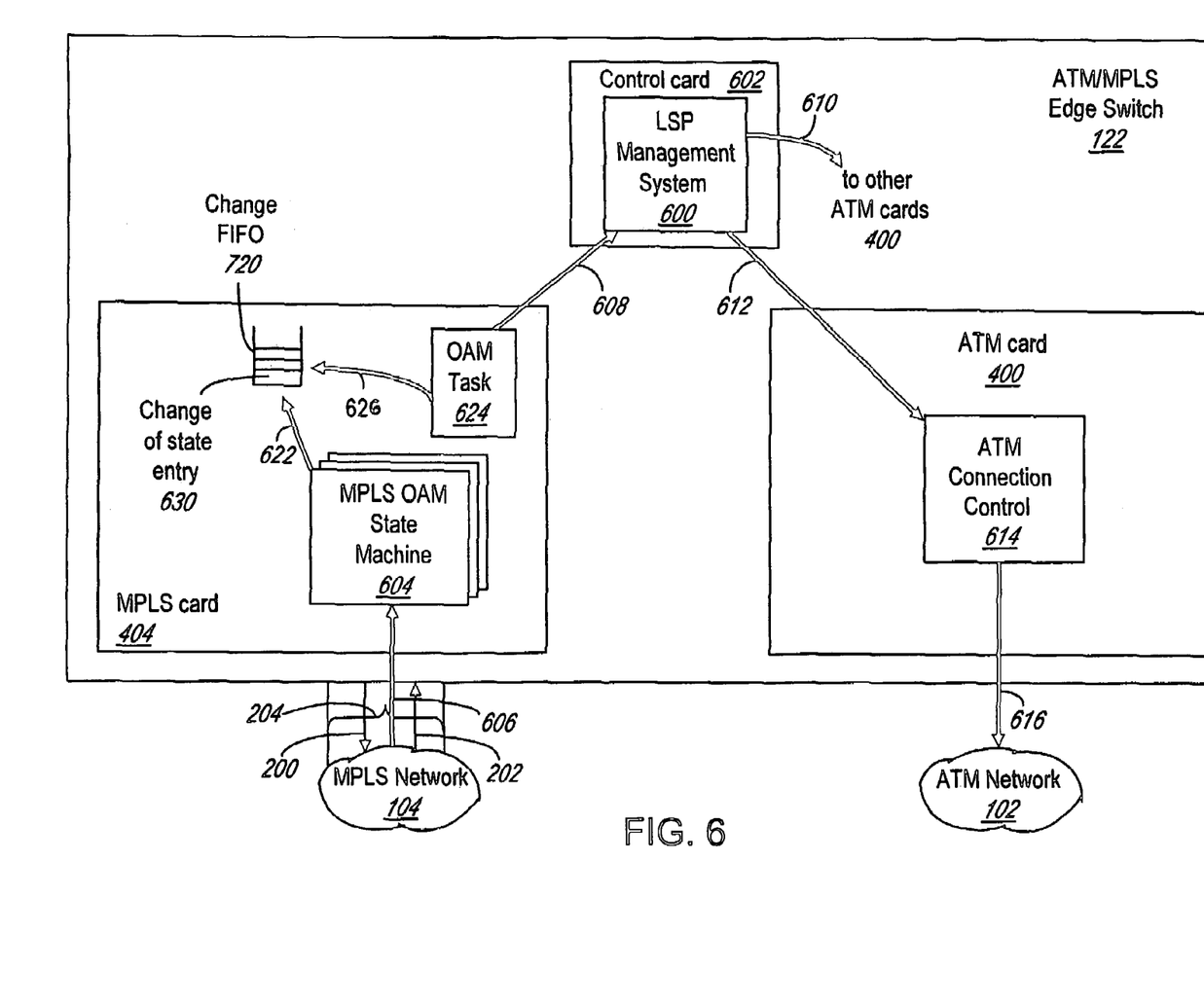
FIG. 6 is a block diagram showing the interworking of MPLS fault indications with ATM connection control in the ATM/MPLS edge switch of FIG. 1.

Referring to FIG. 6, further detail of ATM/MPLS edge switch 122 is provided. ATM/MPLS edge switch 122 has an LSP management system 600 residing on a control card 602. ATM card 400 is illustrated having ATM connection control 614. MPLS card 404 of ATM/MPLS edge switch 122 is also illustrated having MPLS OAM state machine 604, OAM task 624 and Change FIFO 620. Change FIFO 620 is comprised of Change of State entries 630.

Briefly, OAM task 624 communicates with LSP management system 600 to inform it of changes of state of MPLS OAM state machine 604. From this information, LSP management system 600 determines whether tunnel 204 is available for ATM connections and whether ATM AIS cells should be transmitted into ATM network 102, communicating this information to ATM connection control 614. Accordingly, the embodiment provides an interface allowing MPLS tunnel status information to be provided to ATM nodes.

As noted earlier, MPLS network 104 transmits MPLS OAM frames, either CV, FDI or BDI frames, to ATM/MPLS edge switch 122. MPLS OAM frames arrive at OAM state machine 604 in MPLS card 404, shown by arrow 606. There is one MPLS OAM state machine 604 for each tunnel 204 and each failure state, either CV, FDI or BDI failure.

Figure 7:
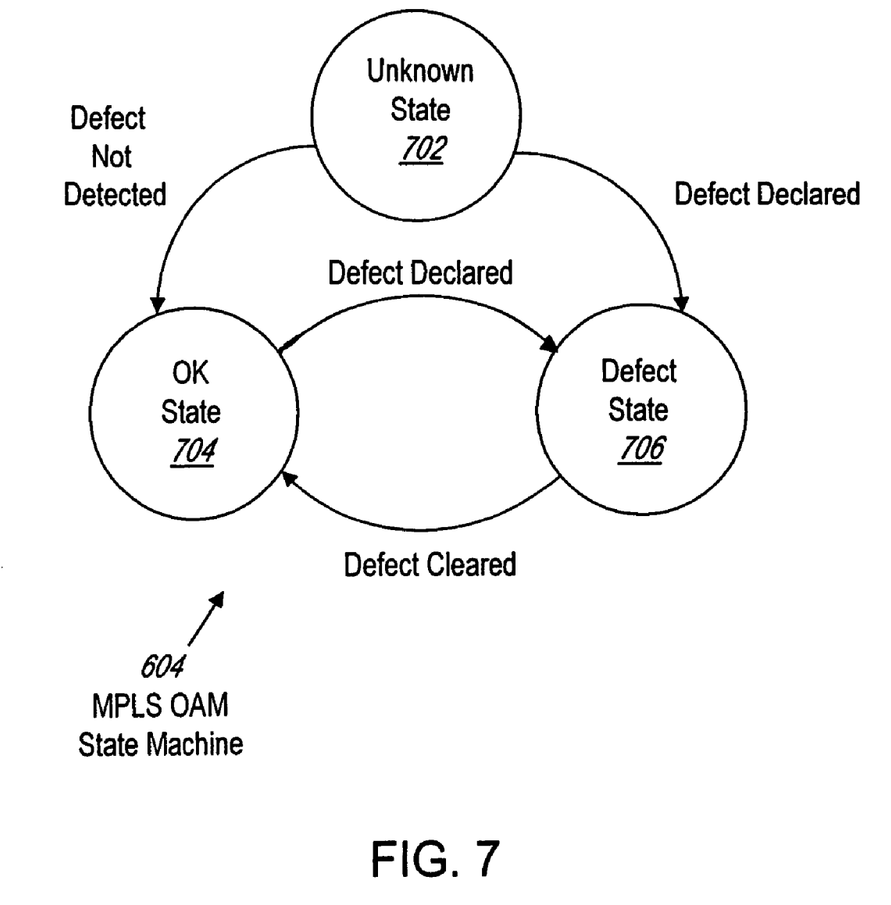
FIG. 7 is a state diagram of a MPLS OAM state machine present in the ATM/MPLS edge switch of FIG. 6.

Referring to FIG. 7, MPLS OAM state machine 604 is shown for one tunnel 204 and one failure state. A MPLS OAM state machine 604 for CV failures will transition from Unknown state 702 to OK state 704 if connectivity verification of the tunnel is successful. Connectivity verification may be successful upon receipt of a consecutive number of CV frames. MPLS OAM state machine 604 for CV failures will transition from Unknown state 702 to Defect state 706 if connectivity verification fails.

In performing connectivity verification, CV frames should be received by MPLS OAM state machine 604 for CV failures periodically, about once every second. However, after a period of time has elapsed without receiving a CV frame, MPLS OAM state machine 604 for CV failures moves to Defect state 706. This time period may be configurable. A debounce mechanism is provided for CV frames by setting the period of time after which a CV failure is declared to a time longer than one second. In the embodiment, the time period is three seconds.

For MPLS OAM state machine 604 for BDI failures, when in Unknown state 702 or OK state 704 and it receives a BDI frame, MPLS OAM state machine 604 moves to Defect state 706. The same is true for MPLS OAM state machine 604 for FDI failures, moving from Unknown state 702 to Defect state 706 when it receives a FDI frame.

While in Defect state 706, the defect can be cleared. For MPLS OAM state machine 604 for CV failures, the defect is cleared when the MPLS OAM state machine 604 receives a series of consecutive CV frames. The number of CV frames may be configurable. In the embodiment, the default number of CV frames needed to clear a CV failure is 3. For MPLS OAM state machine 604 for BDI failures, the defect is cleared when the MPLS OAM state machine 604 does not receive a further BDI frame within a defined period of time. The defined period of time may be varied by the MPLS OAM state machine 604. In the embodiment, the default defined period is three seconds. A defect in MPLS OAM state machine 604 for FDI failures is similarly cleared. Upon the clearing of a defect, MPLS OAM state machine 604 moves to OK state 704.

In OK state 704, transitions are made to Defect state 706 upon the absence of receipt of a number of CV frames or the receipt of either a BDI or FDI frame, as described above.

Referring back to FIG. 6, when a MPLS OAM state machine 604 for tunnel 204 indicates a change of state to Defect state 706, it generates and enqueues a Change of State entry 630 on Change FIFO 620, indicated by arrow 622. The entry 630 contains information about the destination LSP and MPLS OAM status information. OAM task 624 periodically monitors FIFO 620 for new entries. Upon detection of a new entry therein, OAM task 624 transmits an indication of the failure state of either or both of LSPs 200 and 202 in tunnel 204 to LSP management system 600, indicated by arrow 608.

If tunnel 204 is in a state indicating that LSP 200 is "down" (see table A), LSP management system 600 broadcasts this to ATM connection control 614 in ATM cards 400 and LSP 200 cannot be used. This broadcast is indicated by arrows 610 and 612. ATM connection control 614 in each ATM card 400 receives this message and stops transmitting data over a failed LSP 200.

When a MPLS OAM state machine 604 is informed by arriving MPLS OAM frames or lack thereof that LSP 200 which was "down" is now "up", it transitions to OK state 704 and writes a change of state entry 630 to Change FIFO 620, indicated by arrow 622. OAM task 624 reads this change of state from Change FIFO 620, indicated by arrow 626, and indicates the change to LSP management system 600, shown by arrow 608. LSP management system 600 broadcasts this to ATM connection control 614 in ATM cards 400 and LSP 200 can now be used to transmit data. This broadcast is indicated by arrows 610 and 612. ATM connection control 614 in each ATM card 400 receives this message and can again transmit data over LSP 200.

If the information from Change of State entry 630 provided to LSP management system 600 indicates that LSP 202 is "down", LSP management system 600 broadcasts this to ATM connection control 614 in ATM cards 400. This broadcast is indicated by arrows 610 and 612. For each ATM connection connected over a failed LSP 202, ATM connection control 614 starts inserting ATM AIS cells into ATM network 102, indicated by arrow 616. The ATM AIS cell contains a code identifying it as an ATM AIS cell. The ATM cell header contains the virtual path identifier (VPI) and virtual connection identifier (VCI) that uniquely specifies the individual ATM connection.

When a MPLS OAM state machine 604 is informed by arriving MPLS OAM frames or lack thereof that LSP 202 which was "down" is now "up", it transitions to OK state 704 and writes a change of state entry 630 to Change FIFO 620, indicated by arrow 622. OAM task 624 reads this change of state from Change FIFO 620, indicated by arrow 626, and indicates the change to LSP management system 600, shown by arrow 608. LSP management system 600 broadcasts this to ATM connection control 614 in ATM cards 400. This broadcast is indicated by arrows 610 and 612. For each ATM connection connected over a recovered LSP 202, ATM connection control 614 stops inserting ATM AIS cells into ATM network 102 and transmits the normal data cells received, indicated by arrow 616.

The system and method of interworking MPLS OAM frames with ATM OAM cells informs ATM networks 102 of failures in MPLS network 104 providing information that can be used to route around failures in network 100. ATM networks 102 can be instructed by LSP management system 600 to avoid transmitting data on failed tunnels 204, as is described above, providing a more reliable network 100.

It is noted that those skilled in the art will appreciate that various modifications of detail may be made to the present embodiment, all of which would come within the scope of the invention.

We claim:

1. In an ATM network carrying an ATM connection across a core MPLS network in a label switched path (LSP), an ATM/MPLS edge node for notifying the ATM network of a failure in the LSP, the edge node comprising:

an MPLS interface for monitoring operation of the LPS, and generating a failure state indication if the failure affects a routing path across the MPLS network or a MPLS port of the routing path on the edge node;

an ATM interface for generating and transmitting an ATM OAM alarm indication signal (AIS) packet on receipt of the failure state indication; and, a controller for monitoring operation of the routing path within the edge node, and operation of the ATM and MPLS interfaces;

wherein the MPLS interface transmits the ATM OAM AIS packet transparently over the LSP when the failure affects the MPLS port of the routing path on the edge node, and generates and transmits an MPLS OAM forward defect indication (FDI) packet over the LSP when the failure affects the routing path between the ATM network interface and the MPLS network interface; and, wherein the MPLS network interface comprises:

a MPLS GAM state machine for each LSP tunnel originating at the edge node for receiving an MPLS OAM frame indicating a change of state of operation of the routing path carried in a LSP tunnel across the MPLS network; and, an OAM task module for placing change of state signals from all MPLS QAM state machines in a queue and for informing a LSP management system of each change of state in order.

2. The edge node of claim 1, wherein the ATM network interface further comprises means for transmitting the ATM OAM AIS to a node in a first segment of the ATM network affected by the failure, if the failure is at the MPLS network interface or in the MPLS network.

3. In an ATM network carrying an ATM connection across a core MPLS network in a label switched path (LSP), an ATM/MPLS edge node for notifying the ATM network of a failure in the LSP, the edge node comprising:

an MPLS interface for monitoring operation of the LPS, and generating a failure state indication if the failure affects a routing path across the MPLS network or a MPLS port of the routing path on the edge node;

an ATM interface for generating and transmitting an ATM OAM alarm indication signal (AIS) packet on receipt of the failure state indication; and, a controller for monitoring operation of the routing path within the edge node, and operation of the ATM and MPLS interfaces;

wherein the MPLS interface transmits the ATM OAM AIS packet transparently over the LSP when the failure affects the MPLS port of the routing path on the edge node, and generates and transmits an MPLS OAM forward defect indication (FDI) packet over the LSP when the failure affects the routing path between the ATM network interface and the MPLS network interface; and, wherein the ATM network interface further comprises means for transmitting the ATM OAM AIS to a node in a first segment of the ATM network affected by the failure, if the failure is at the MPLS network interface or in the MPLS network.

4. The edge node of claim 3, wherein the MPLS network interface comprises:

a MPLS OAM state machine for each LSP tunnel originating at the edge node for receiving an MPLS OAM frame indicating a change of state of operation of the routing path carried in a LSP tunnel across the MPLS network; and, an OAM task module for placing change of state signals from all MPLS OAM state machines in a queue and for informing a LSP management system of each change of state in order.

5. For an ATM network carrying an ATM connection in a label switched path (LSP) over a core MPLS network, a method of notifying network nodes about a disruption in service, comprising the steps of:

a) providing an ATM/MPLS edge switch at an interface between the ATM network and the MPLS network;

b) establishing a routing path traversing a first segment of the ATM network, over the edge switch to the MPLS network towards a second segment of the ATM network;

c) monitoring the routing path at the edge switch and generating an alarm signal upon detection of a fault affecting the LSP; and, d) transmitting the alarm signal to all network nodes of the ATM network affected by the fault.

6. The method of claim 1, wherein step c) comprises:

c1) generating a change of state signal at a MPLS network interface on the edge switch for providing a failure state indication for the LSP;

c2) transmitting the failure state indication to an ATM network interface on the edge switch; and, c3) based on the indication, generating at the ATM network interface the alarm signal, wherein the alarm signal is an ATM OAM alarm indication signal (AIS) packet.

7. The method of claim 6, wherein said step c1) comprises:

monitoring from the MPLS network interface a status of the LSP using MPLS OAM packets received from the MPLS network; and, detecting the fault and generating the failure state indication at the MPLS network interface, wherein the failure state indication indicates a failure in the LSP across the MPLS network.

8. The method of claim 6, wherein step c1) comprises:

monitoring from the MPLS network interface operation of a MPLS port of the LSP using physical interface circuitry; and, detecting the fault and generating the failure state indication at the MPLS network interface, wherein the failure state indication indicates a failure at the MPLS port of the edge switch.

9. The method of claim 5, wherein step c) comprises:

monitoring from the edge switch, operation of the MPLS network interface using a controller provided on the edge switch;

detecting the fault at the MPLS network interface and generating the failure state indication demonstrating a failure at the MPLS network interface and transmitting the failure state indication to an ATM network interface on the edge switch; and, at the ATM network interface, generating the alarm signal; wherein the alarm signal is an ATM OAM alarm indication signal (AIS) packet, based on the failure state indication.

10. The method of claim 5, wherein step c) comprises:

monitoring the routing path between an MPLS network interface and an ATM network interface at the edge switch using a controller provided on the edge switch;

detecting the fault within the edge switch and generating a failure state indication demonstrating a failure on the routing path between the ATM network interface and the MPLS network interface;

based on the failure state indication, generating at the ATM network interface an ATM OAM alarm indication signal (AIS) packet; and, generating at the MPLS network interface an MPLS OAM forward defect indication (FDI) packet.

11. The method of claim 1, wherein step c) comprises:

monitoring operation of an ATM interface at the edge switch from a controller on the edge switch;

detecting the fault at the ATM network interface and generating a failure state indication demonstrating a failure on the routing path at the ATM network interface; and, generating at the MPLS network interface an ATM OAM alarm indication signal (AIS) packet based on the failure state indication.

12. The method of claim 5, wherein step c) comprises:

monitoring from an ATM network interface operation of the routing path at an ingress port on the edge switch;

detecting the fault at the ingress port and generating a failure state indication demonstrating a failure on the ingress port;

transmitting the failure state indication to an MPLS network interface on the edge switch; and, generating at the MPLS network interface an ATM OAM alarm indication signal (AIS) packet based on the indication.

13. A method of notifying a first communication network of a fault related to a second communication network, the first communication network connected to the second communication network, the first communication network having a first OAM protocol adapted to monitor integrity of the first communication network, the second communication network having a second OAM protocol adapted to monitor integrity of the second communication network, the method comprising:

detecting the fault related to the second communication network;

generating a first OAM cell of the first OAM protocol indicating detection of the fault; and, transmitting the first OAM cell to the first communication network to indicate the fault to the first communication network;

wherein the first communication network is connected with the second communication network at a network element; and, wherein the first communication network is an ATM network, the first OAM protocol is an ATM OAM protocol, the second communication network is a MPLS network, and the second OAM protocol is a MPLS OAM protocol.

14. The method of claim 13 wherein the first OAM cell is an ATM AIS cell.

15. A network element for connecting a first ATM communication network to a second MPLS communication network, the first ATM communication network having a first communication protocol and a first ATM OAM protocol for use in monitoring integrity of the first ATM communication network, the second MPLS communication network having a second communication protocol and a second MPLS OAM protocol for use in monitoring integrity of the second MPLS communication network, the network element comprising:

a first ATM section for providing communications for the network element with the first ATM communication network, for notifying the network element of a fault in the first ATM communication network, and for detecting the fault by receiving an GAM forward defect indicator (FDI) cell of the first ATM OAM protocol; and, a second MPLS section for providing communications for the network element with the second MPLS communication network, for detecting that the first ATM section has notified the network element of the fault, and for notifying the second MPLS communication network of the fault.

16. The network element of claim 15 wherein the network element is an edge switch, the first ATM section includes an ATM card, and the second MPLS section includes a MPLS card.

17. The network element of claim 15 wherein the fault is detected by the first ATM section after receiving an OAM cell of the first OAM protocol.

18. The network element of claim 17 wherein the OAM cell is a FDI cell.

19. The network element of claim 15 wherein the first ATM section periodically transmits connectivity verification cells to the first ATM communication network.

20. The network element of claim 19 wherein the fault in the first ATM communication network is detected by the first ATM section by recognition of expiry of a time interval without receiving at least one of the connectivity verification cells, the first ATM section being scheduled to receive a number of the connectivity verification cells in the interval.

21. The network element of claim 20 wherein the number of the connectivity verification cells is at least three.

22. The network element of claim 15 wherein the first OAM FDI cell is an ATM AIS cell.

* * * * *

UNITED STATES PATENT AND TRADEMARK OFFICE
CERTIFICATE OF CORRECTION

PATENT NO. : 7,596,094 B2
APPLICATION NO. : 11/417172
DATED : September 29, 2009
INVENTOR(S) : Puppa et al.

It is certified that error appears in the above-identified patent and that said Letters Patent is hereby corrected as shown below:

Column 15, line 50 and Column 16, line 34, for the claim reference numeral "1", each occurrence should read --5--.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,596,094 B2                                           Page 1 of 1
APPLICATION NO.  : 11/417172
DATED            : September 29, 2009
INVENTOR(S)      : Puppa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Fourteenth Day of December, 2010

David J. Kappos
*Director of the United States Patent and Trademark Office*